(12) United States Patent
Balabhadruni et al.

(10) Patent No.: US 9,467,907 B2
(45) Date of Patent: Oct. 11, 2016

(54) HANDOVER OF USER-EQUIPMENT (UE) UNDETECTED EMERGENCY CALLS

(71) Applicant: Telefonaktiebolaget L M Ericsson (publ), Stockholm (SE)

(72) Inventors: Venkata Ramesh Balabhadruni, Kista (SE); Ralf Keller, Wurselen (DE); Fredrik Lindholm, Stockholm (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 74 days.

(21) Appl. No.: 14/383,619

(22) PCT Filed: Oct. 10, 2012

(86) PCT No.: PCT/EP2012/070040
§ 371 (c)(1),
(2) Date: Sep. 8, 2014

(87) PCT Pub. No.: WO2013/135316
PCT Pub. Date: Sep. 19, 2013

(65) Prior Publication Data
US 2015/0016420 A1 Jan. 15, 2015

Related U.S. Application Data

(60) Provisional application No. 61/609,434, filed on Mar. 12, 2012.

(51) Int. Cl.
*H04W 4/00* (2009.01)
*H04W 36/00* (2009.01)
(Continued)

(52) U.S. Cl.
CPC ...... *H04W 36/0022* (2013.01); *H04L 65/1006* (2013.01); *H04L 65/1016* (2013.01); *H04L 65/1083* (2013.01); *H04W 4/22* (2013.01)

(58) Field of Classification Search
CPC .............................. H04W 76/007; H04W 4/22
See application file for complete search history.

(56) References Cited

U.S. PATENT DOCUMENTS

2009/0280770 A1* 11/2009 Mahendran ................ 455/404.1
2010/0311386 A1* 12/2010 Edge et al. ................ 455/404.1

FOREIGN PATENT DOCUMENTS

WO 2009/137617 A1 11/2009

OTHER PUBLICATIONS

PCT International Search Report, mailed Jan. 4, 2013, in connection with International Application No. PCT/EP2012/070040, all pages.
(Continued)

*Primary Examiner* — Maharishi Khirodhar
(74) *Attorney, Agent, or Firm* — Leffler Intellectual Property Law, PLLC

(57) ABSTRACT

A solution is presented that includes a method of performing a Single Radio Voice Call Continuity, SRVCC, handover of a telecommunications call established by a User Equipment, UE accessing a serving network using a Packet Switched, PS, access. The serving network includes a serving IMS network and the call is a UE-undetected emergency call anchored in the serving IMS network. The method includes receiving an indication from the serving network that the established call is a UE-undetected emergency call anchored in the serving IMS network. A SRVCC handover request to hand over the call from the PS access to a Circuit Switched, CS, access is received. Handover of the call is initiated so that an Emergency Session Transfer Number-Single Radio, E-STN-SR, is used and the call continues to be routed through the IMS network in which it is anchored.

16 Claims, 14 Drawing Sheets

(51) Int. Cl.
*H04W 4/22* (2009.01)
*H04L 29/06* (2006.01)

(56) References Cited

OTHER PUBLICATIONS

3GPP TS 23.167 "IP Multimedia Subsystem (IMS) emergency sessions (Release 11)" Version 11.4.0, Mar. 8, 2012, pp. 1-42, XP050555323, all pages.

3GPP TS 23.216 "Single Radio Voice Call Continuity (SRVCC) (Release 11)" Version 11.4.0, Mar. 8, 2012, pp. 1-64, XP050555332.
3GPP TS 23.237 "IP Multimedia Subsystem (IMS) Service Continuity; Stage 2 (Release 12)" Jun. 2012, pp. 1-165.
3GPP TS 24.237 "IP Multimedia (IM) Core Network (CN) Subsystem, IP Multimedia Subsystem (IMS) Service Continuity; Stage 3 (Release 11)" Jun. 2012, pp. 1-341.
GSMA Official Document IR.92 "IMS Profile for Voice and SMS, Version 7.0" Mar. 3, 2013, pp. 1-32.

* cited by examiner

HANDOVER OF USER-EQUIPMENT (UE) UNDETECTED EMERGENCY CALLS

CROSS-REFERENCE TO RELATED APPLICATIONS

This application is a national stage application under 35 U.S.C. §371 of PCT/EP2012/070040, filed Oct. 10, 2012, which claims the benefit of U.S. Provisional Application No. 61/609,434, filed Mar. 12, 2012, which is hereby incorporated herein by reference in its entirety.

TECHNICAL FIELD

The present invention relates to methods and apparatus in a telecommunications network for enabling handover of an UE-undetected emergency call between access networks. More particularly, the invention relates to handover of an UE-undetected emergency call with Single Radio Voice Call Continuity (SRVCC).

BACKGROUND

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows person-to-person (client-to-client) as well as person-to-content (client-to-server) communications over an IP-based network. The IMS makes use of the Session Initiation Protocol (SIP) and Session Description Protocol (SDP) to set up and control calls or sessions between user terminals (or user terminals and application servers). Whilst SIP was created as a user-to-user protocol, IMS allows operators and service providers to control user access to services and to charge users accordingly.

A User Equipment (UE) can access the IMS by attaching to an access network. If the access network is a Packet Switched (PS) network, such as an Evolved Packet Core (EPC)/Long Term Evolution (LTE) access network, an IMS session can be set up by the UE using SIP signalling. However, many existing access networks operate only using Circuit Switched (CS) technology, and procedures are well established for dealing with the provision of media and services to a UE accessing the IMS via a CS access network.

There are many occasions when during a call/session it is required to transfer or hand over the call/session from one access network to another. Single Radio Voice Call Continuity (SRVCC) is described in 3GPP TS 23.237 and 3GPP TS 23.216, which specify procedures for handover of a voice call from a PS access to a CS access (e.g. transfer of a VoIP IMS session from an evolved UMTS Radio Access Network—E-UTRAN—to a UTRAN or GSM Edge RAN-GERAN). These technical specifications have also been extended to allow handover of a voice call from a CS access to a PS access. When an emergency call is made to an emergency centre or Public Safety Access Point (PSAP), special procedures are applied to ensure that the call is correctly routed and not interrupted. An emergency call that is established over the IMS is anchored in the IMS entities that serve the UE through the access network at which the UE was attached when the emergency call was established. The specified procedures ensure that at handover the call continues to be routed through those same IMS entities. As part of those procedures an emergency Public Data Network (PDN) connection is established.

However, in some situations it is possible for a UE to perform a so-called UE-undetected emergency call, i.e. a call that is supposed to be routed to an emergency centre, but where the UE is not aware of the emergency call and does not take any specific actions when setting up the call. The Proxy-Call/Session Control Function (P-CSCF) will detect that this is an emergency call from the SIP INVITE sent from the UE to set up the call, because it includes an emergency number. But, because the Invite is sent over a normal registration (and not an emergency registration), and because the INVITE Request-URI does not include an SOS-URI parameter (which it should do to make it clear it is an emergency call) then the P-CSCF will know that it is a UE-undetected emergency call.

The current procedures specify that the P-CSCF may allow the network to continue the emergency call establishment even if the P-CSCF detects this to be an UE-undetected emergency call. In that case, the P-CSCF indicates to the UE that this is an emergency session. In such cases no emergency PDN connection is established prior to the establishment of the call and so the Mobility Management Entity (MME) is not aware that it is an emergency call.

However, if a SRVCC handover of the UE-undetected Emergency Call is performed, the MME and the Mobile Switching Centre (MSC) will not know that the call is an emergency call and the handover will fail. This is because the MSC will use a regular Session Transfer Number for SRVCC (STN-SR) provided by the MME to route the session transfer request. The use of the regular STN-SR will not route the call from the MSC via the IMS network in which the call is anchored.

SUMMARY

Solutions to the previously described problems are presented below.

In one aspect a solution includes a method of performing a Single Radio Voice Call Continuity, SRVCC, handover of a telecommunications call established by a User Equipment, UE accessing a serving network using a Packet Switched, PS, access. The serving network includes a serving IMS network and the call is a UE-undetected emergency call anchored in the serving IMS network. The method includes receiving an indication from the serving network that the established call is an UE-undetected emergency call anchored in the serving IMS network. A SRVCC handover request to hand over the call from the PS access to a Circuit Switched, CS, access is received. Handover of the call is initiated so that an Emergency Session Transfer Number-Single Radio, E-STN-SR, is used and the call continues to be routed through the IMS network in which it is anchored.

In an embodiment, the indication that established call is an UE-undetected emergency call is received at a Mobile Management Entity, MME. The MME sends the SRVCC handover request to a Mobile Switching Centre, MSC, server and informs the MSC server that the call to be handed over is an UE-undetected emergency call so that the MSC server initiates handover of the call using the E-STN-SR, which is pre-configured in the MSC server. The indication that the call is an UE-undetected emergency call may be received in a message sent from a Policy and Charging Control, PCC, entity, such as a Policy and Charging Rules Function (PCRF), to the MME.

In another embodiment the indication that the established call is an UE-undetected emergency call is received at an Access Transfer Control Function, ATCF, when the call is established. The ATCF provides information identifying the call to an Emergency Access Transfer Function, EATF, at which the call is anchored.

In an embodiment, when the SRVCC handover request is received the ATCF determines that the call to be handed over is an UE-undetected emergency call and send a message to the EATF specifying the E-STN-SR for completing the handover of the call.

In another embodiment, when the SRVCC handover request is received by the ATCF from a MSC server, the ATCF determines that the call to be handed over is an UE-undetected emergency call and send a response with an emergency call indication to the MSC server so that the MSC server can use the E-STN-SR for completing the handover of the call.

In another aspect a solution includes a method in a telecommunications network of performing a SRVCC handover of a UE-undetected emergency call, wherein the call is initially established over an IMS network. The method includes identifying in the IMS that the call is an UE-undetected emergency call. An indication that the call is an UE-undetected emergency call is included in a message sent to a PCC entity. An indication that the call is an UE-undetected emergency call is included in a message sent from the PCC entity to a MME. A SRVCC handover request is sent from the MME to an MSC, and the MSC is informed that the call to be handed over is an UE-undetected emergency call. Handover of the call is initiated using an E-STN-SR pre-configured in the MSC so that the call continues to be routed through the IMS network in which it was established.

In another aspect, a solution includes a telecommunications network entity having: an input/output through which messages and data are received from and sent to other network entities; a processor; and a memory storing data and instructions for configuring the processor. The instructions configure the processor such that when the network entity receives an indication that a call established by a UE accessing a serving network using a PS access, is a UE-undetected emergency call, wherein the serving network includes a serving IMS network in which the UE-undetected emergency call is anchored, and, either concurrently or subsequently, receives a Single Radio Voice Call Continuity, SRVCC, handover request to hand over the call from the PS access network to a Circuit Switched, CS, access network, the network entity initiates handover of the call so that an E-STN-SR is used and the call continues to be routed through the IMS network in which it is anchored.

In an embodiment, the network entity is configured as Mobile Management Entity of an Evolved Packet Core, EPC, network. In another embodiment, the network entity is configured as an Access Transfer Control Function in the IMS network.

In another aspect, a solution includes an IMS network entity configured as a Proxy-Call Session Control Function, P-CSCF. The P-CSCF entity includes: an input/output through which messages and data are received from and sent to other network entities; a processor; and a memory storing data and instructions for configuring the processor. The instructions configure the processor to detect that a request to establish a call from a User Equipment, UE, is for an UE-undetected emergency call and either to include an indication that the call is an UE-undetected emergency call in a message sent to a Policy and Charging Control, PCC, entity, or to forward the request together with an emergency call indication to an Access Transfer Control Function to establish the call as an UE-undetected emergency call anchored in the IMS network.

In another aspect a solution includes a method in a telecommunications network that includes receiving, at a Proxy-Call Session Control Function, P-CSCF, of an IMS network a request from a User Equipment, UE, to establish a call. The request received is detected to be a request to establish an UE-undetected emergency call. Either indication that the call is an UE-undetected emergency call is included in a message sent to a Policy and Charging Control, PCC, entity; or the request is forwarded together with an emergency call indication to an Access Transfer Control Function to establish the call as an UE-undetected emergency call anchored in the IMS network.

In another aspect a solution includes a Mobile Switching Centre, MSC, server of a telecommunications network. The MSC server includes: an input/output through which messages and data are received from and sent to other network entities; a processor; and a memory storing data and instructions for configuring the processor. The instructions configure the processor such that, on receiving a SRVCC handover request together with an indication that the call to be handed over is an UE-undetected emergency call anchored in an IMS network, the MSC server initiates handover of the call using an E-STN-SR pre-configured in the MSC server so that the call continues to be routed through the IMS network in which it was established.

In another aspect a solution includes a method in a telecommunications network that includes receiving, at an MSC server, a SRVCC handover request to hand over a call from a PS to a CS access, together with an indication that the call to be handed over is an UE-undetected emergency call anchored in an IMS network. Handover of the call is initiated using an E-STN-SR pre-configured in the MSC server so that the call continues to be routed through the IMS network in which it was established.

In accordance with these or further aspects, a solution includes a Policy and Charging Control, PCC, entity of an IMS network. The PCC entity includes: an input/output through which messages and data are received from and sent to other network entities; a processor; and a memory storing data and instructions for configuring the processor. The instructions configure the processor such that, on receiving an indication that a call is an UE-undetected emergency call, the PCC entity includes an indication that the call is an UE-undetected emergency call in a message sent to a Mobile Management Entity, MME.

In accordance with these or further aspects, a solution includes an IMS network entity configured as an Emergency Access Transfer Function, EATF. The entity includes: an input/output through which messages and data are received from and sent to other network entities; a processor; and a memory storing data and instructions for configuring the processor. On receiving an indication from an Access Transfer Control Function, ATCF, that an emergency call established by a User Equipment, UE accessing the IMS network via a Packet Switched, PS, access network, is a UE-undetected emergency call together with information identifying the call, the EATF stores the call identifying information; and on receiving a message requesting a SRVCC handover of the call to a Circuit Switched, CS, access network together with information identifying the emergency call, the instructions configure the processor such that it progresses the SRVCC handover of the call using the call identifying information.

DETAILED DESCRIPTION

Figure 1:
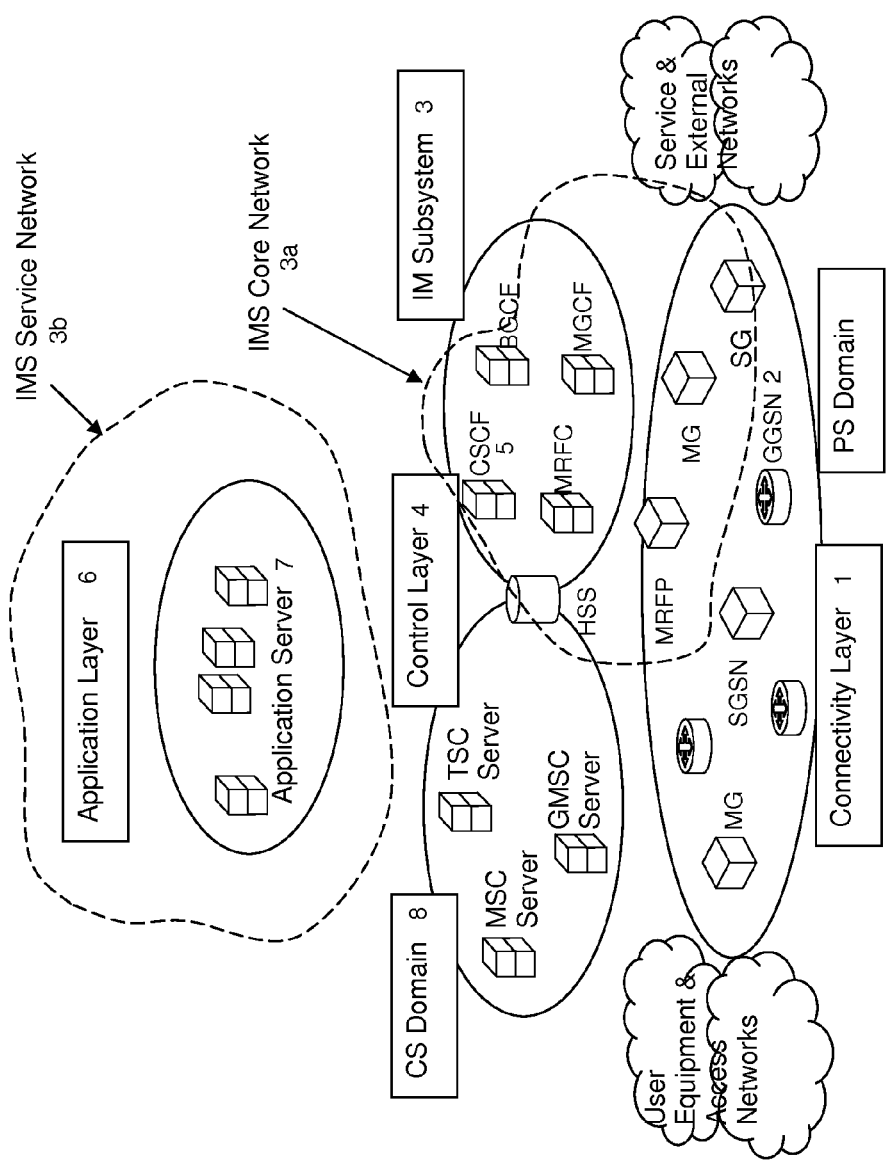
FIG. 1 illustrates schematically an IMS network in association with a mobile network architecture of a General Packet Radio Service (GPRS) access network.

FIG. 1 illustrates schematically how the IMS fits into the mobile network architecture in the case of a General Packet Radio Service (GPRS) access network. As shown in FIG. 1 control of communications occurs at three layers (or planes). The lowest layer is the Connectivity Layer 1, also referred to as the bearer plane and through which signals are directed to/from user equipment (UE) accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A gateway GPRS support node (GGSN) 2 acts as an interface between the GPRS backbone network and other networks (radio network and the IMS network). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2 at the Connectivity Layer 1 and network nodes that include Call/Session Control Functions (CSCFs) 5, which operate as SIP proxies within the IMS in the middle, Control Layer 4. The top, Application Layer 6 includes the IMS service network 3b. Application Servers (ASs) 7 are provided for implementing IMS service functionality.

As shown in FIG. 1, a User Equipment (UE) can access the IMS by attaching to an access network and then over the Connectivity Layer 1, which is part of a Packet Switched (PS) domain. For example, the UE may attach via an Evolved Packet Core (EPC)/Long Term Evolution (LTE) access. In that case an IMS session can be set up by the UE using SIP signalling. However, many existing access networks operate only using Circuit Switched (CS) technology, but a UE may also access IMS services via a CS domain 8. Although the CS domain will not handle SIP, procedures are well established for dealing with the provision of media and services between the IMS and a UE using a CS access.

There are many occasions when during a call/session it is required to transfer or hand over the call/session from one access network to another. There are a variety of factors that are used to determine when a call needs to be handed over to another access network, but these are not particularly relevant to the present discussion. The access network determines, based on the cells for which the UE reports measurements, when the conditions arise that require a request to be made to the core network for the call to be handed over.

Figure 2:
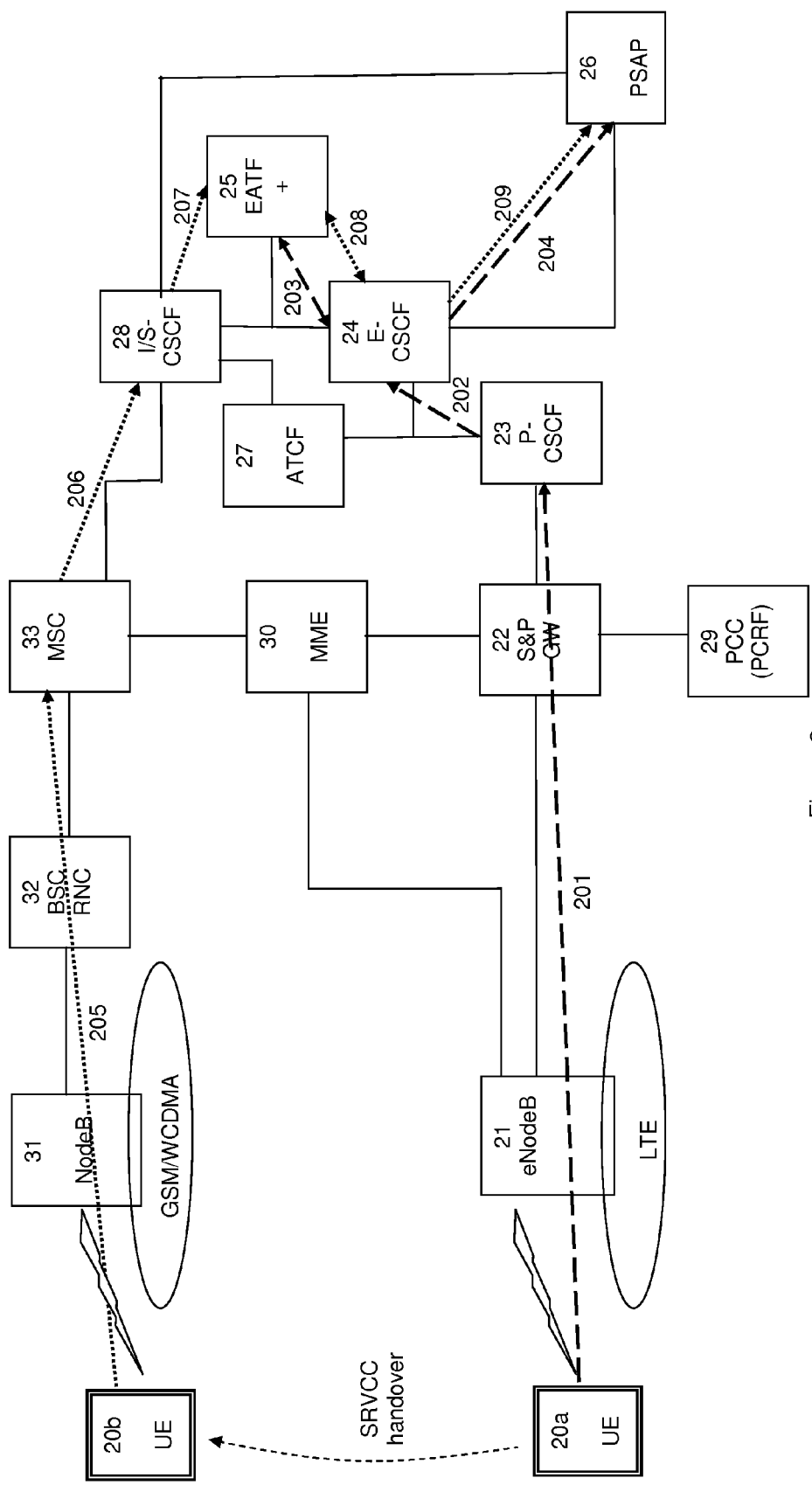
FIG. 2 illustrates schematically the principal network components involved in a SRVCC handover of an emergency call from a PS access to a CS access.

FIG. 2 illustrates schematically the principal network components involved in a Single Radio Voice Call Continuity (SRVCC) handover of an emergency call from a PS access network (which in the illustration is a Long term Evolution, LTE, access network as exemplified by the eNodeB 21 access point) to a CS access network (which in the illustration is a GSM/WCDMA access network containing a NodeB 31 access point). A UE 20 accesses an IMS network over the PS access network. The UE 20 is capable of accessing both the CS and the PS access network and has corresponding interfaces for each type of access. FIG. 2 shows the UE 20 in two positions: UE 20a using its PS access capability before the handover and UE 20b using its CS capability after the handover.

The UE 20a initiates an emergency call over the PS access and the call is routed to a Public safety Answering Point (PSAP) 26 via the IMS, as shown by the dashed line arrows 201-204. The call is anchored in the IMS at the Emergency Access Transfer Function (EATF) 25. Handover of the call from the PS to the CS access is controlled by a Mobile Management Entity (MME) 30. After the handover of the call to the CS access, the call is routed from the UE 20b via the IMS as shown by the dotted line arrows 205-209.

The principal network entities shown for the PS access include the eNodeB 21, and a Serving and PDN gateway (S&P GW) 22. The call is routed via the IMS entities, Proxy-Call/Session Control Function (P-CSCF) 23 and Emergency-CSCF (E-CSCF) 24. For the CS access, the principal network entities through which the call is routed include the NodeB 31, a Base Station Controller/Radio Network Controller (BSC/RNC) 32 and a Mobile Switching Centre (MSC) Server 33. As previously described, because this is an emergency call anchored in the IMS, after the SRVCC handover, the emergency call continues to be routed through the IMS network in which it is anchored —i.e. via Interrogating CSCF, I-CSCF, 28 to the EATF 25 and E-CSCF 24. The CSCF 28 is shown as including both an Interrogating CSCF, I-CSCF, as well as a Serving CSCF, S-CSCF. The S-CSCF role is only applicable for the registration procedures. Also shown in FIG. 2 in the IMS network is an Access Transfer Control Function (ATCF) 27, the significance of which will become apparent in the ensuing description.

The established procedure that results in the SRVCC PS to CS handover illustrated in FIG. 2, requires that the UE includes an emergency call indication so that the MSC Server 33 knows to route the call via the IMS, as illustrated, using an Emergency Session Transfer Number-Single Radio (E-STN-SR). However, situations arise where the UE 20 (e.g. a Voice-over-LTE—VoLTE-UE) cannot include this indication. This is because it cannot detect that the call is an emergency call, for example because it may not have been configured to recognize the number/address to which the call is being sent as an emergency number/address. In these UE-undetected emergency call situations, the session establishment request is sent to the P-CSCF 23 as in a normal session establishment procedure, using normal IMS registration. The P-CSCF 23 detects that this is a request to establish an emergency session and allows the emergency session establishment to continue by inserting the explicit emergency indication in the session request. The P-CSCF 23 forwards the request to the E-CSCF 24 in the same IMS network and the emergency session is established following normal emergency session establishment procedures.

Figure 3:
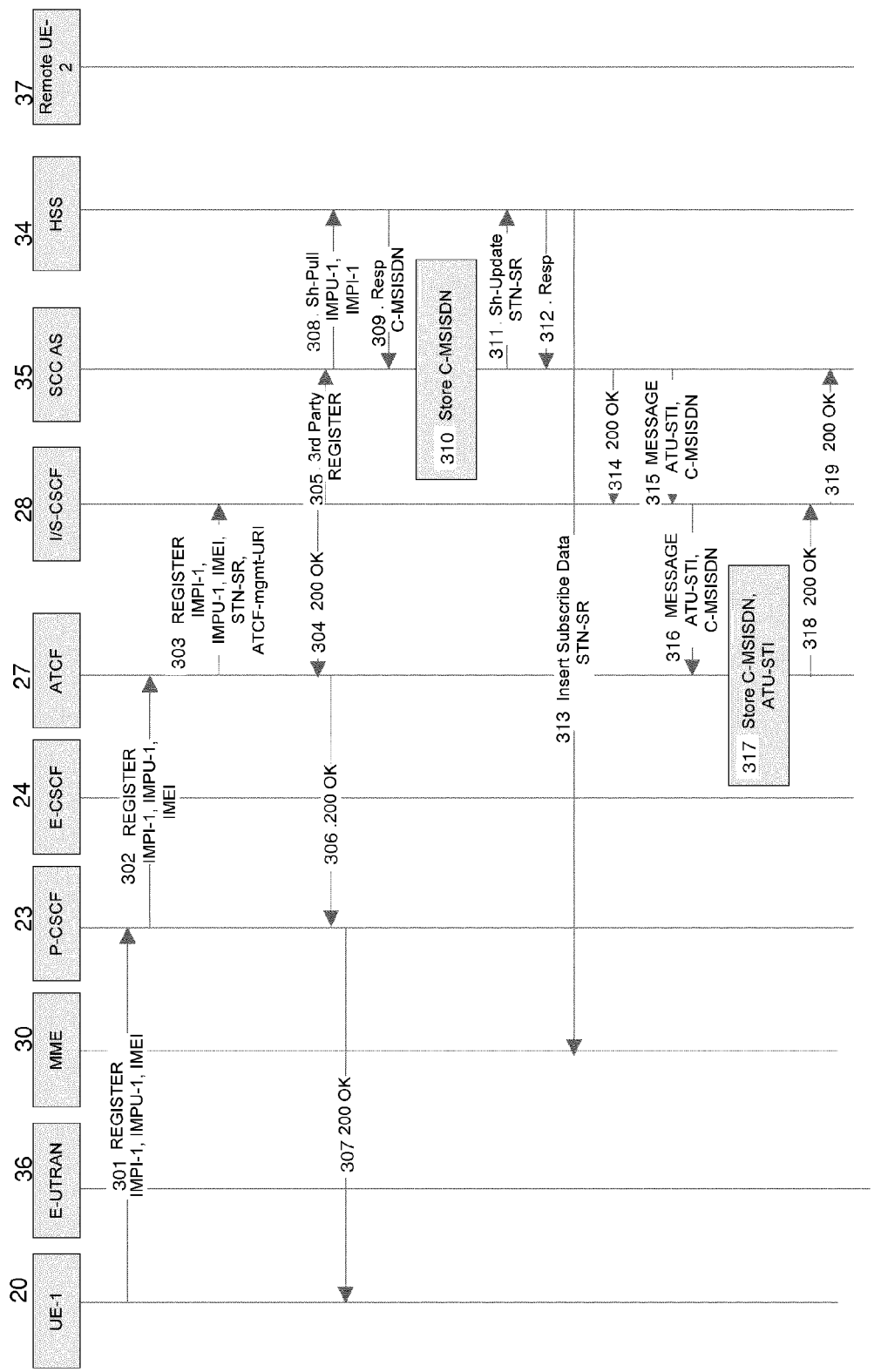
FIG. 3 is a signal diagram for a normal IMS registration procedure.
Figure 4:
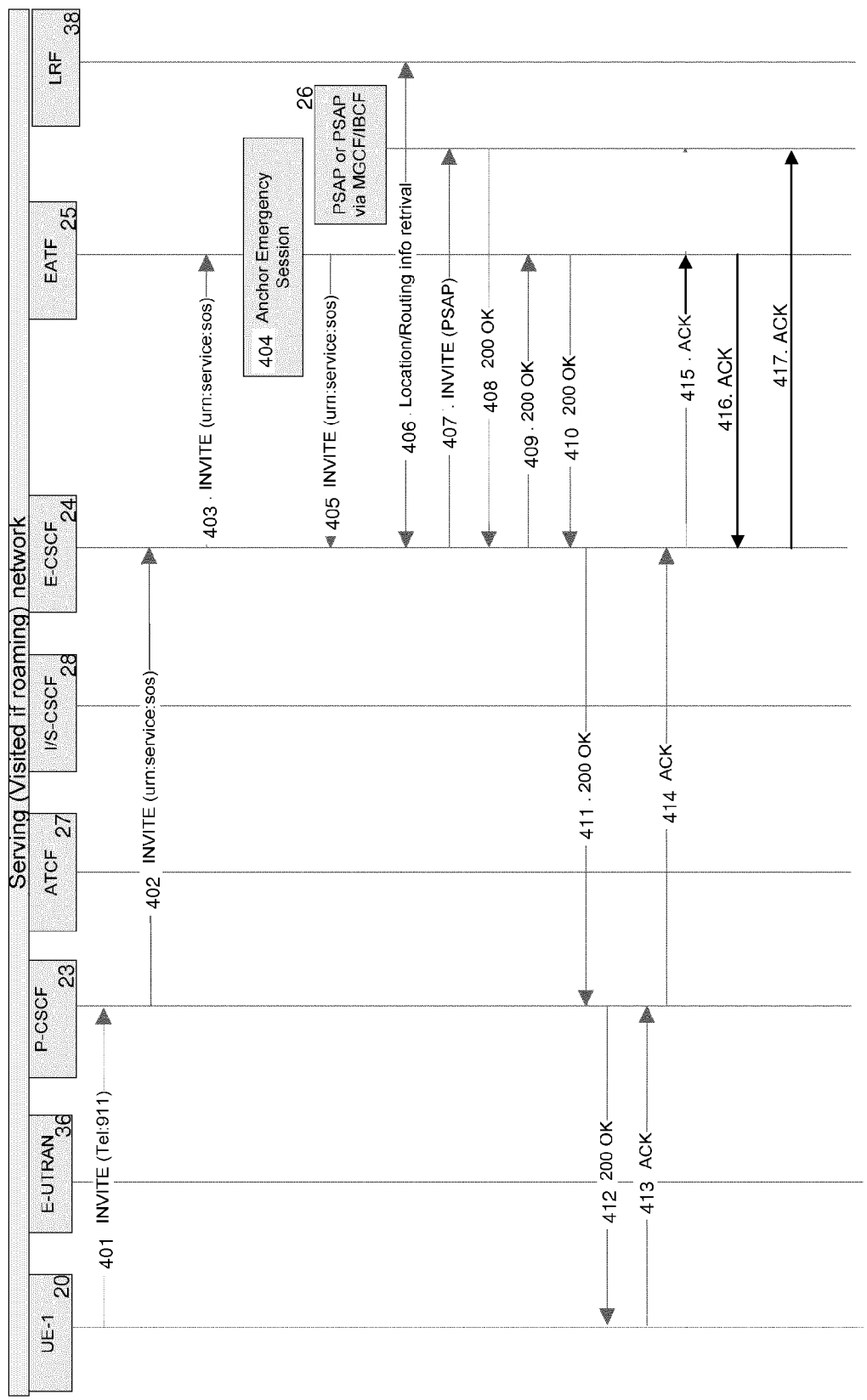
FIG. 4 is a signal diagram for establishment of a UE-undetected emergency session.

The signaling involved in the registration and UE-undetected emergency call establishment are illustrated in FIGS. 3 and 4, respectively. The network entities shown in FIG. 2 are identified with the same reference numerals. In addition, as shown in FIG. 3, the registration procedure involves the Home Subscriber Server (HSS) 34 serving the subscriber who is using the UE 20, and a Service Centralization and Continuity Application Server (SCCAS) 35. The UE 20 accesses the network over an Evolved UT Radio Access network (E-UTRAN) 36. Also shown is a remote UE 37 with which the UE 20 might seek to establish a call/session.

As shown in FIG. 3, signal 301 is a Session Initiation Protocol (SIP) REGISTER request sent from the UE 20 to the P-CSCF 23, and includes the IP Multimedia Private and Public Identities (IMPI an IMPU) as well as a the UE's International Mobile Equipment Identity (IMEI). This is forwarded in REGISTER signal 302 to the ATCF 27. In signal 303, the ATCF 27 forwards the REGISTER request and associated information together with a Session Transfer Number-Single Radio (STN-SR) to the I/S-CSCF 28, and SIP 200 OK responses are returned in signals 304, 306 and 307 back to the UE 20. Also, the I/S-CSCF 28 forwards the REGISTER request to the SCCAS 35 in signal 305. In Sh-Pull and Response signals 308 and 309 the SCCAS obtains the Correlation-Mobile Subscriber Integrated Services Digital Network-Number (C-MSISDN) from the HSS 34, and at step 310 stores this number. Signal 311 is an Sh-Update sent from the SCCAS 35 to the HSS to inform it of the STN-SR, as provided by the ATCF 27, for this registration. The HSS sends a response 312 and also informs the MME 30 of the STN-SR in signal 313. The SCCAS 35 responds with a 200 OK signal 314 to the I/S-CSCF 28 and sends a further message 315 informing the I/S-CSCF 28 of an Access Transfer Update-Session Transfer Identifier (ATU-STI) as well as the C-MSISDN. This message is forwarded (signal 316) to the ATCF 27, which, at step 317 stores this information. 200 OK replies are returned via the I/S-CSCF 28 to the SCCAS 35 in signals 318 and 319.

As shown in FIG. 4, the UE 20 initiates a UE-undetected emergency call (hereafter abbreviated UEUEC) by sending a SIP INVITE 401 to the P-CSCF 23. The P-CSCF recognises from the called number (or URI) that it is an emergency call and so forwards the INVITE to the E-CSCF 24 in signal 402 including an emergency (sos) indication. In signal 403 the E-CSCF 24 forwards the INVITE to the EATF 25, and in step 404 the EATF anchors the emergency session before returning the INVITE to the E-CSCF in signal 405. In signals 406 the E-CSCF retrieves location and routing information from a Location Retrieval Function (LRF) 38 and then forwards the INVITE in signal 407 to the PSAP 26 (as shown this may involve routing the INVITE via a Media Gateway Control Function—MGCF—and/or an Interconnection Border Control Function—IBCF—depending on the location information provided by the LRF 38). The procedure is completed by signals 408 to 412, which are 200 OK responses sent through the network entities to the UE 20 as shown, and signals 413-417, which are Acknowledgements sent back to the EATF 25 and PSAP 26.

Figure 5:
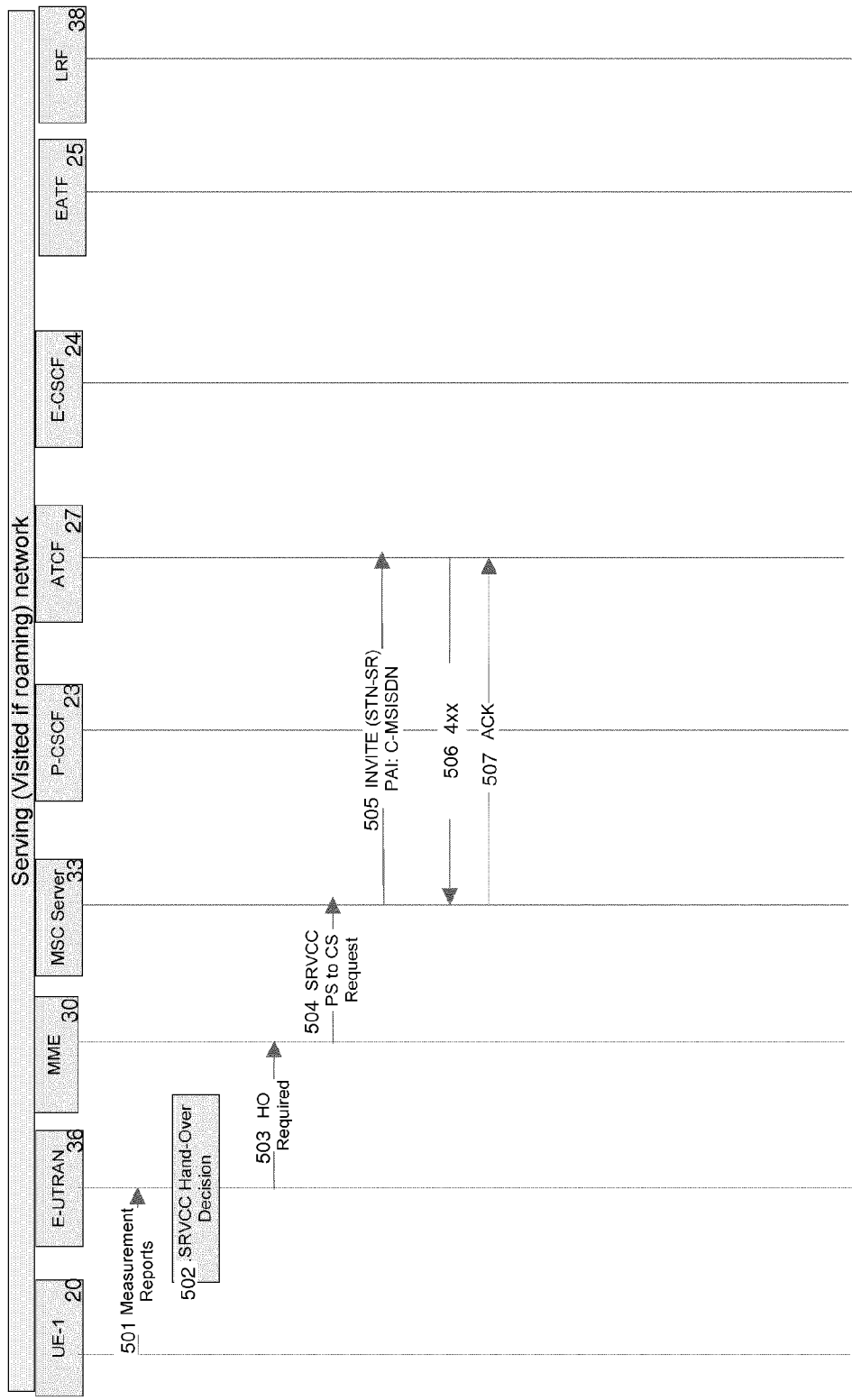
FIG. 5 is a signal diagram showing an unsuccessful SRVCC handover of a UE-undetected emergency call established in accordance with the signalling of FIG. 4.

As shown in FIG. 5, the UE 20 sends measurement reports 501 to the E-UTRAN 36, from which the access network determines, at step 502, when to initiate a SRVCC handover. The handover is initiated by sending a HO required signal 503 to the MME 30. The MME 30 sends a SRVCC PS to CS handover request 504 to the MSC server 33 (on the CS access side). From the MME's point of view the ongoing session is not an emergency session and uses a normal bearer, and so no emergency indication is included in the SRVCC PS to CS Request message 504. The MSC server 33 does not know that the call being handed over is an emergency call, and so it follows the procedure for a normal call by sending an INVITE 505 specifying the STN-SR and including the C-MSISDN to the ATCF 27. In order to progress the handover request for the emergency call the ATCF needs to find the emergency call. Since the ATCF is not involved in the emergency call setup, it cannot route the handover request and instead returns a 4xx response 506 to the MSC server. This is acknowledged in signal 507, and the handover is unsuccessful. As a consequence of this the handover request is rejected and the emergency call may be prematurely terminated.

Figure 6:
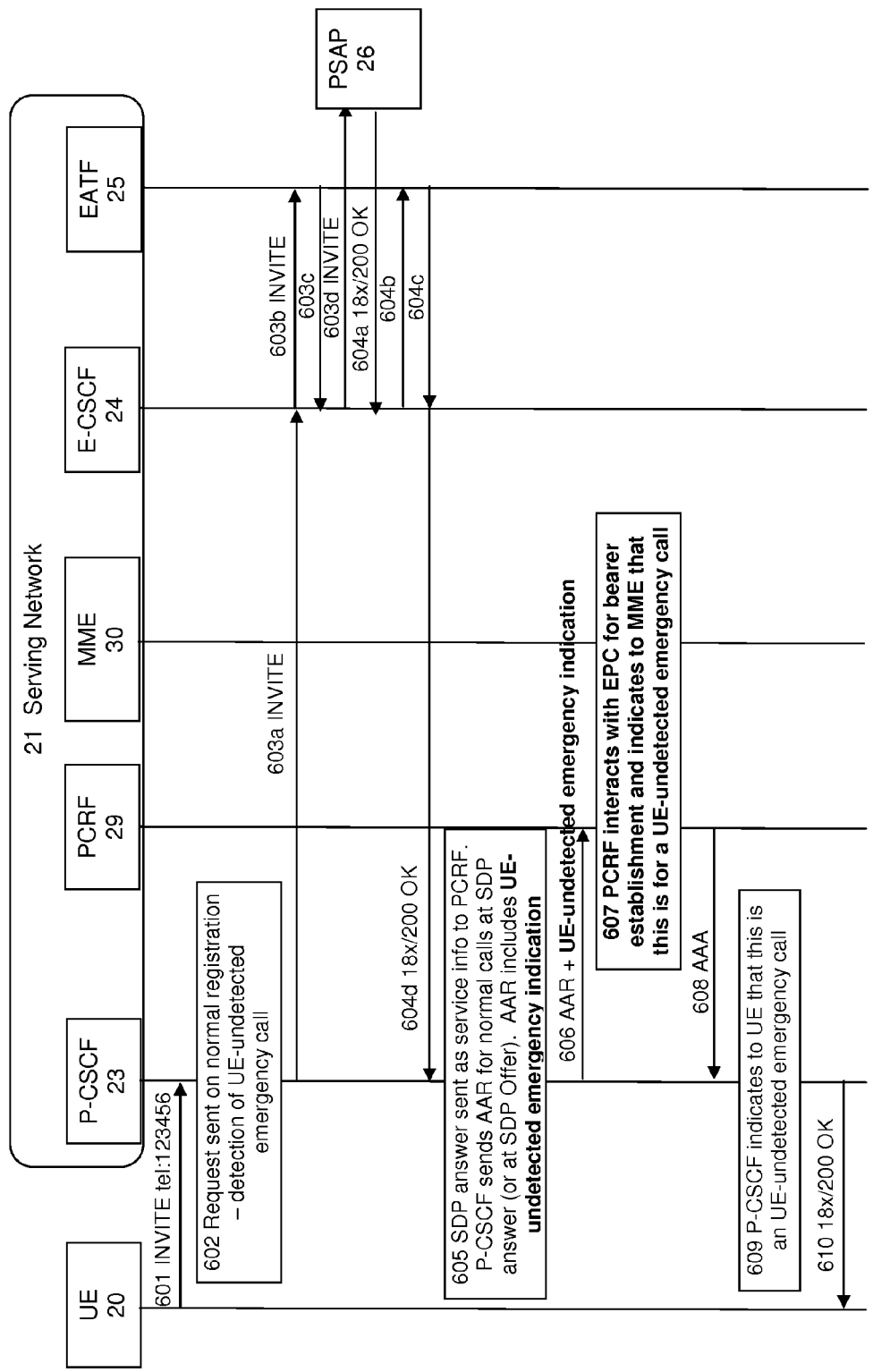
FIG. 6 is a signal diagram of a first embodiment illustrating a sequence of signalling for a UE-undetected emergency call establishment.

FIG. 6 is a signal diagram illustrating a sequence of signalling for a UEUEC establishment used in a first embodiment of a solution to the above-described problems. As shown in FIG. 6, when the P-CSCF 23 detects (at step 602) that the originated call 601 from UE 20 is an emergency session, it marks the session as an emergency session and routes it towards the PSAP (signals 603a-d), via the IMS entities: E-CSCF 24 and EATF 25. As part of the session setup (step 605), the P-CSCF 23 informs the Policy and Charging Control (PCC)—in this case the PCRF 29—that the call is a UEUEC session by including an additional indication in one of the messages it sends to PCRF 29 as part of the normal procedure, which in the example shown in FIG. 6 is an Authentication and Authorisation Request AAR message 606. The PCC (PCRF 29) then informs the MME 30 that this is an UEUEC session by including an additional indication in one of the messages it sends to the Evolved Packet Core (EPC) as part of the normal procedure (step 607). The procedure is completed through return of AAA message 608. At step 609 the P-CSCF 23 informs the UE 20 that it is an UEUEC and completes the procedure with a 200 OK signal 610.

The following changes have been made compared to the normal/current call establishment for an UEUEC:

The P-CSCF indicates an UEUEC to the PCRF.

The PCRF interacts with the EPC for bearer establishment and indicates to the EPC (including MME) that it is for a UEUEC.

As the call may be considered as a normal call from the packet core and radio perspective (as no dedicated emergency PDN connection is used, and emergency bearers are not necessarily used), normal SRVCC procedures will apply if the UE is coming into a situation where SRVCC is triggered.

In the event that a SRVCC handover is triggered by the access network, the MME 30 indicates that the call is related to an UEUEC to the MSC Server 33. The MSC Server 33 uses this information to decide whether to allocate resources for a normal voice call (TS11) or for an emergency call (TS12) depending on configuration. In any case, the MSC Server 33 selects the E-STN-SR as specified in TS 23.216 and TS 23.237 for routing the session transfer request for the emergency call instead of the STN-SR that would otherwise have been chosen for an UEUEC. The signal flow diagrams in FIGS. 7 and 8 show the changes to the procedures necessary to ensure that a SRVCC handover can be performed.

Figure 7:
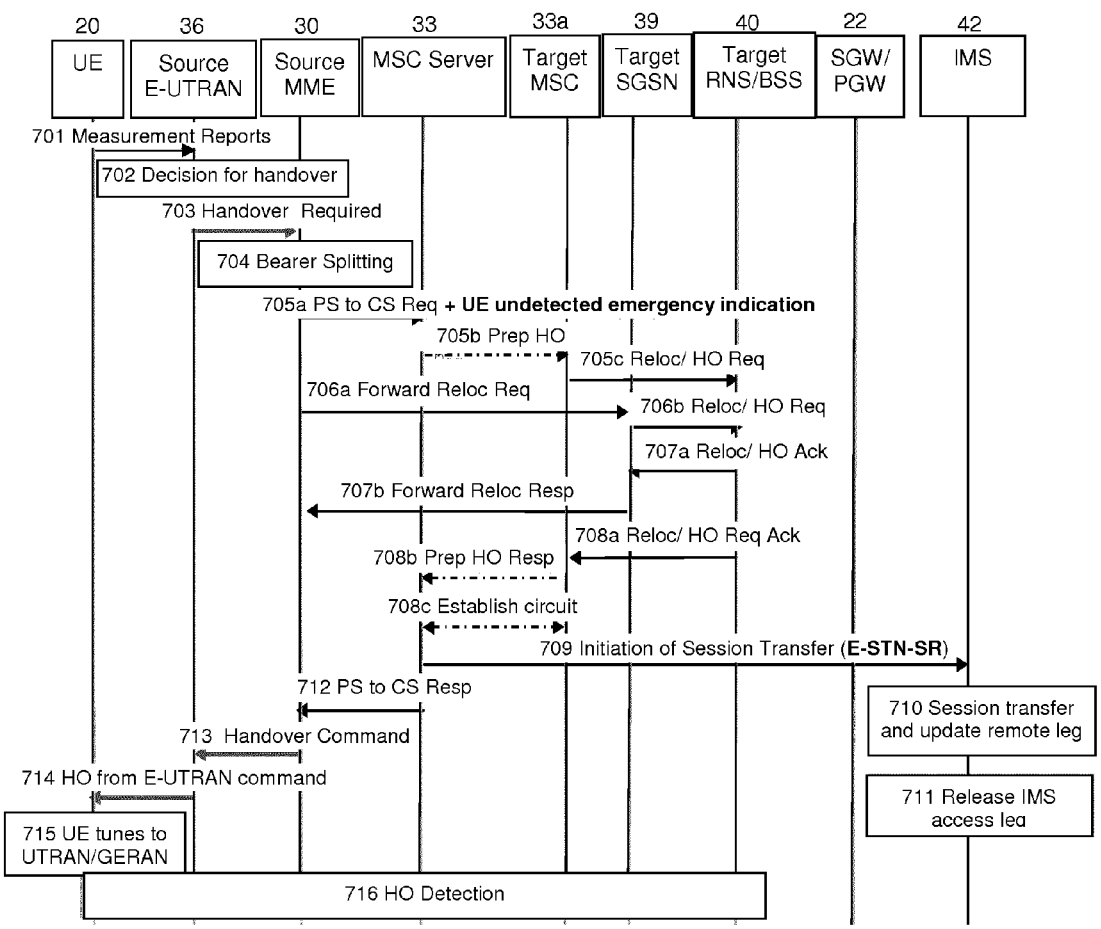
FIG. 7 is a signal diagram illustrating a sequence of signalling for a SRVCC handover of a UE-undetected emergency established in accordance with the signalling of FIG. 6.
Figure 8:
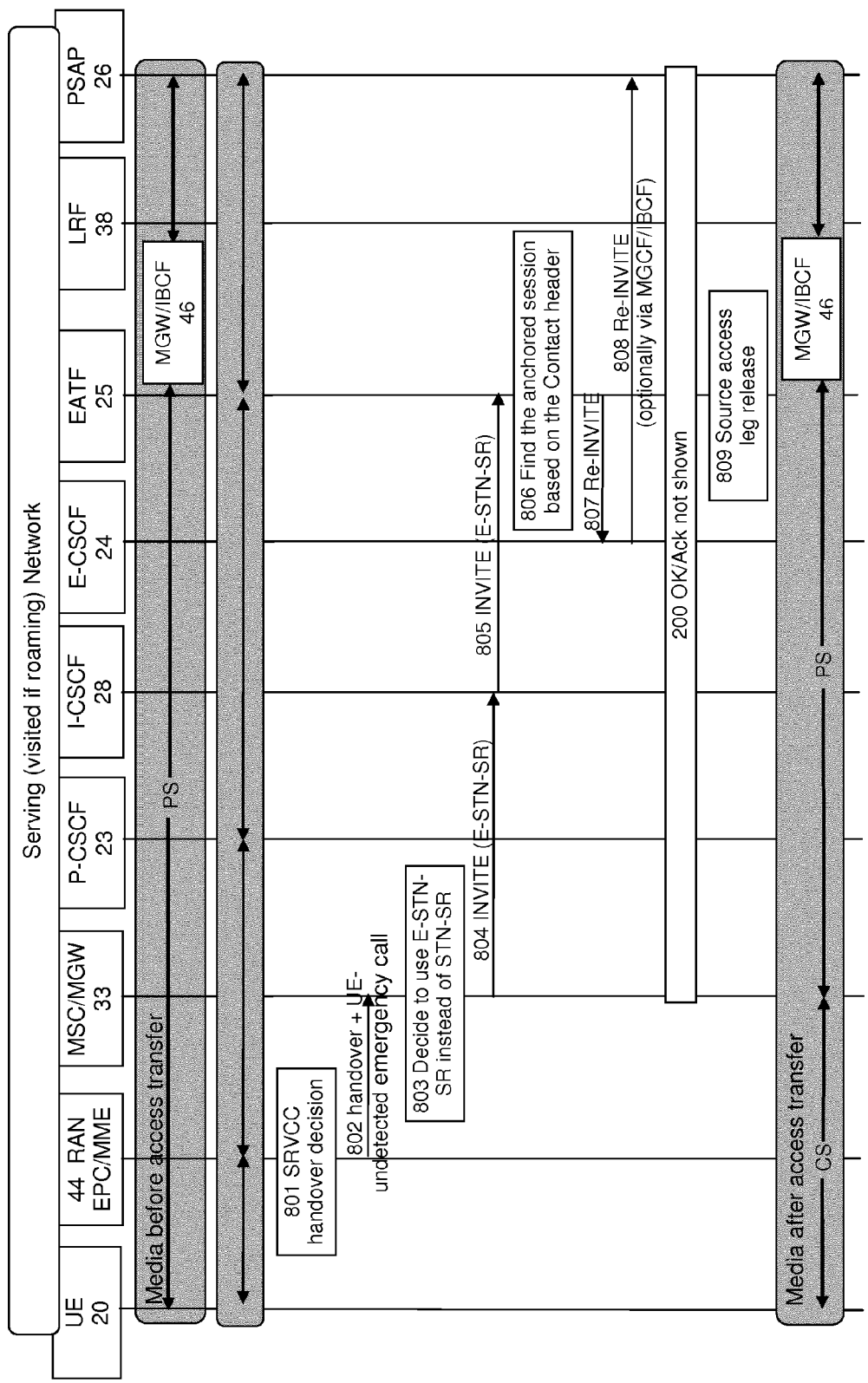
FIG. 8 is a signal diagram illustrating the sequence of signalling in IMS entities for the SRVCC handover of FIG. 7.

FIG. 7 is a signal diagram illustrating a sequence of signalling for a SRVCC handover of a UEUEC established in accordance with the signalling of FIG. 6. FIG. 7 shows part of the procedure for a SRVCC handover, as described in 3GPP TS 23.216. The sequence of signalling is essentially the same as described in the standard with the changes/additions indicated in bold in FIG. 7.

Signals 701 to 703 are the same signals 501 to 503 described above and shown in FIG. 5. At step 704 the MME 30 performs a bearer splitting operation (if required) for different media in the session. In signal 705a, based on the information received from the PCC (as described above, and not because of an emergency PDN connection), the MME 30 indicates to the MSC Server 33 that this handover request is for an UEUEC. Signals 705b to 708c relate to the preparations on the CS access side for the handover, involving a target MSC 33a a target serving GPRS support node (SGSN) 39 and a target Radio Network Server/Base Station Server (RNS/BSS) 40.

In signal 709, based on the indication received from the MME 30, the MSC Server 33 knows this to be an emergency session, and so initiates the Session Transfer by using the locally configured E-STN-SR and by including the equipment identifier (IMEI). IMS Service Continuity or Emergency IMS Service Continuity procedures are applied for execution of the Session Transfer, as specified in 3GPP TS 23.237, as indicated by step 710 and 711. Additionally, depending on current regulations, the MSC Server 33 may use the emergency indication also to reserve resources with emergency priority in the CS network (i.e. using TS12) instead of reserving resources for a normal call (TS11). Signals 712 to 714 follow the standard procedure such that at step 715 the UE tunes to the CS access (UTRAN/GERAN) and at step 716 the handover of the call is detected by the network entities.

FIG. 8 is a signal diagram illustrating the sequence of signalling in IMS entities for the SRVCC handover of FIG. 7. FIG. 8 shows a similar scenario to FIG. 7, but including more details about the IMS entities. The entities shown include the UE 20, the serving (or visited if roaming) network that includes: the PS access network (EPC/MME) 44; MSC 33 (shown combined with a Media Gateway, MGW) for the CS access after SRVCC handover; the IMS entities P-CSCF 23, I-CSCF 28, E-CSCF 24 and EATF 25; LRF 38 and the PSAP 26. The media traffic is shown, before and after the handover, as passing via MGW/IBCF 46. Step 801 and signal 802 show the triggering of a handover such that, at step 803, the MSC Server 33 decides to use the E-STN-SR instead of the STN-SR, based on the UE undetectable emergency call indicator received from the MME at step 802. The call is routed to the IMS (signal 804), and to the EATF (signal 805), which correlates the call with the current ongoing call and completes the access transfer (steps/signals 806 to 809).

The following summarises the new procedures of the above-described embodiment that are introduced to support the SRVCC emergency service:

P-CSCF informs the PCC (PCRF) that the established session is an UEUEC session;

PCC (PCRF) informs the EPC that the bearer establishment is for an UEUEC session;

In case of a SRVCC handover, the MME includes the indication that this is a UEUEC into the handover request sent to the MSC Server;

The MSC Server, when receiving the indication that it is a UEUEC, decides locally to allocate resources for TS11 or TS12, and will also have enough information to know that the E-STN-SR should be used instead of the STN-SR.

The procedures and changes described above enable support of emergency SRVCC even in the case of a UE-undetected emergency call.

Figure 9:
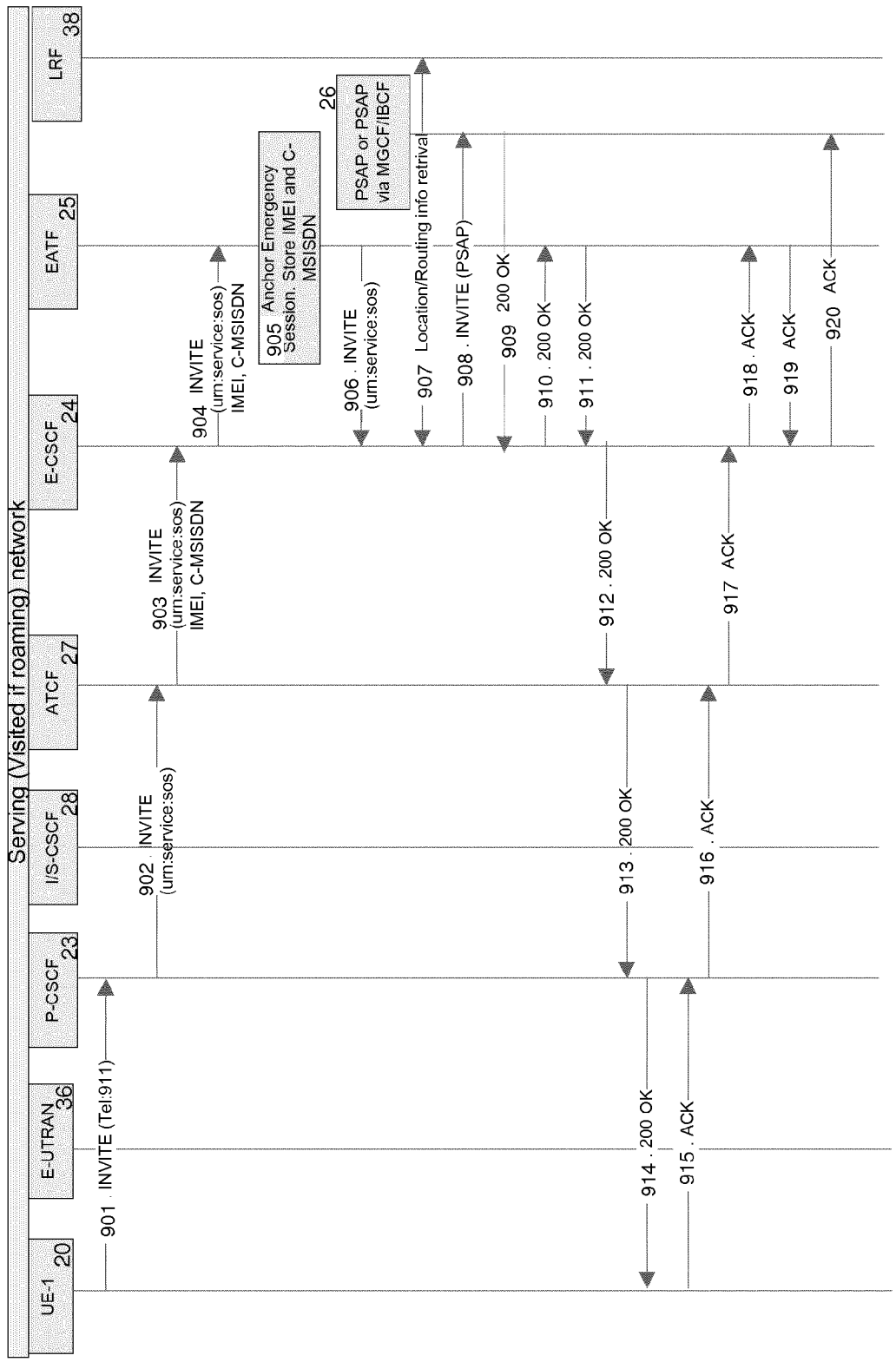
FIG. 9 is a signal diagram of a second embodiment illustrating a sequence of signalling for a UE-undetected emergency call establishment.

FIG. 9 is a signal diagram illustrating a sequence of signalling for a UEUEC session establishment used in a second embodiment of a solution to the above-described problems. The sequence in FIG. 9 is similar to that shown in FIG. 4, except that in this case the P-CSCF 23 invokes the ATCF 27 in the serving network during the UEUEC session establishment. During the SRVCC handover of the emergency session, the ATCF 27 coordinates the session transfer from the PS access to the CS access (e.g. E-UTRAN to GERAN/UTRAN).

As shown in FIG. 9, the UE 20 initiates a UEUEC by sending a SIP INVITE 901 to the P-CSCF 23. As the UE could not detect the emergency session, the session establishment request is sent to P-CSCF as for a normal session establishment procedure. Prior to sending the session establishment request the UE must have been registered in the IMS using the normal registration procedures as depicted in FIG. 3. The P-CSCF 23 recognises from the called number that it is an emergency call and allows the emergency session establishment to continue by inserting the explicit emergency (sos) indication in the session establishment request (INVITE). The P-CSCF 23 also detects that the emergency session is requested on a non-emergency bearer. However, in this case, instead of forwarding the INVITE directly to the E-CSCF 24, the P-CSCF 23 forwards it to the ATCF 27 in signal 902 including the emergency (sos) indication.

The ATCF 27 is configured with the addresses for the E-CSCF 24, including E-STN-SR. The ATCF 27 prioritizes the emergency session and includes the emergency sos indication, C-MSISDN and IMEI in the INVITE before forwarding it to the E-CSCF 24 in signal 903. In signal 904 the E-CSCF 24 forwards the INVITE to the EATF 25, and in step 905 the EATF anchors the emergency session and also stores the IMEI and C-MSISDN. Signals 906 to 920 are essentially the same as signals 405 to 417 shown in FIG. 4, except that at signal 912 a 200 OK reply is sent to the ATCF 27 and the ATCF 27 returns an acknowledgement (ACK) to the E-CSCF at signal 917.

Figure 10:
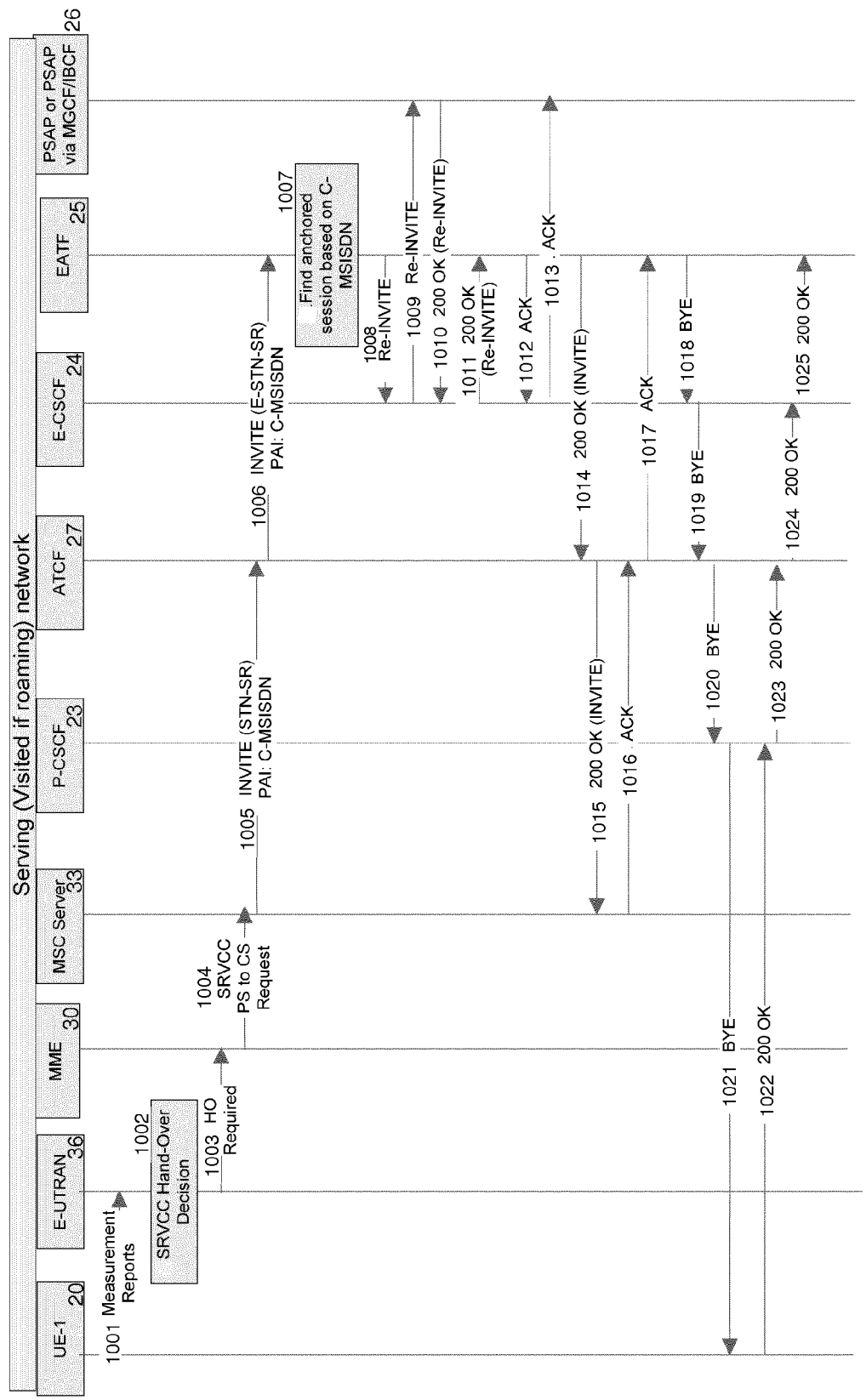
FIG. 10 is a signal diagram illustrating a first alternative sequence of signalling for a SRVCC handover of a UE-undetected emergency established in accordance with the signalling of FIG. 9.

FIG. 10 is a signal diagram illustrating a first alternative sequence of signalling for a SRVCC handover of the UEUEC established in FIG. 9. Steps/signals 1001 to 1005 are the same as steps/signals 501 to 505 in FIG. 5. Based on measurement reports 1001 from the UE 20, the E-UTRAN 36 determines, at step 1002, to initiate a SRVCC handover and sends a HO required signal 1003 to the MME 30. The MME 30 sends a SRVCC PS to CS handover request 1004 to the MSC server 33. The emergency indication is not included in the SRVCC PS to CS handover request message 1004, and so the MSC Server follows the procedure for a normal call by sending an INVITE 1005 to the ATCF 27 specifying the STN-SR and including the C-MSISDN in the P-Asserted-Identity header.

When the ATCF 27 receives the session transfer INVITE 1005, it determines that this is for an emergency session from the received C-MSISDN. The ATCF 27 replaces the STN-SR in the Request-URI with the E-STN-SR and forwards the session transfer INVITE to the EATF 25 in signal 1006. In step 1007 the EATF 25 finds the anchored emergency session (the local and remote call legs) based on the C-MSISDN received in session transfer INVITE 1006. The EATF 25 performs the remote call leg update by sending a Re-INVITE request 1008 to the E-CSCF 24. The E-CSCF 24 forwards the Re-INVITE request to the PSAP 26 in signal 1009. After the Re-INVITE is answered by the PSAP 26 in 200 OK signals 1010 and 1011, sent via the E-CSCF 24, the EATF 25 generates an Acknowledgement (ACK), which is forwarded to E-CSCF 24 and then to the PSAP 26 in signals 1012 and 1013. Signals 1014 and 1015 are 200 OK responses to the INVITEs 1006 and 1005 sent back from the EATF 25 to the ATCF 27 and MSC server 33 and they are acknowledged in signals 1016 and 1017. After the successful SRVCC handover the EATF 25 terminates the local call leg of the original emergency session by sending a BYE message, which is sent back through the network to the UE 20 (signals 1018 to 1021) and 200 OK replies are returned in signals 1022 to 1025. FIG. 10 shows an optimized sequence of signalling between the ATCF 27 and the EATF 25, where the ATCF 27 is configured to be able to route the INVITE request 1006 directly to the EATF 25 based on E-STN-SR. In a normal scenario, the ATCF 27 would route the INVITE request 1006 through an I-CSCF 28 (see FIG. 2).

Figure 11:
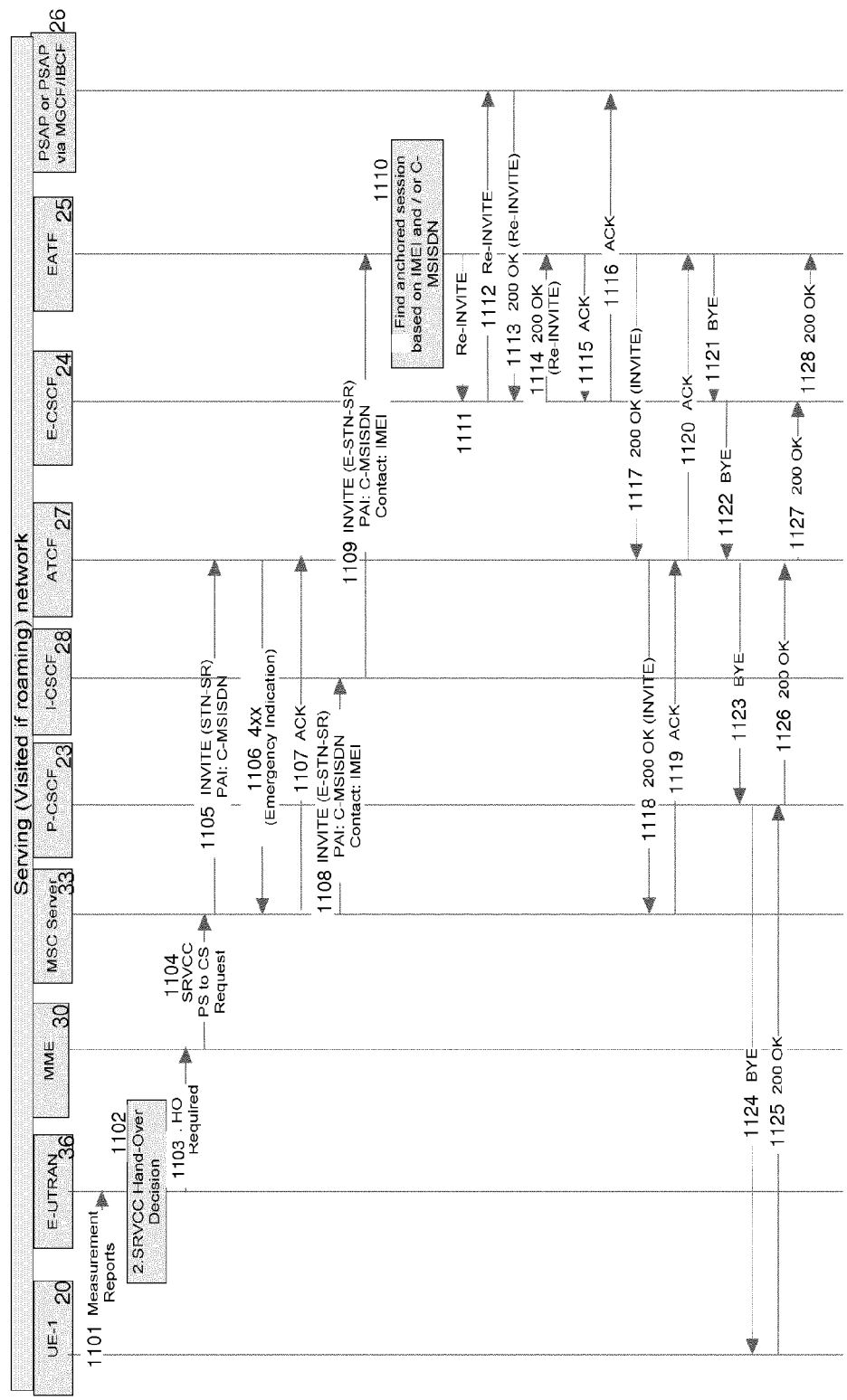
FIG. 11 is a signal diagram illustrating a second alternative sequence of signalling for a SRVCC handover of a UE-undetected emergency established in accordance with the signalling of FIG. 9.

FIG. 11 is a signal diagram illustrating a second alternative sequence of signaling for a SRVCC handover of the UEUEC established in FIG. 9. Steps/signals 1101 to 1105 are the same as steps 1001 to 1005 in FIG. 10. In this alternative, when the ATCF 27 receives the session transfer INVITE 1105, it determines that this is for an emergency session based on the received C-MSISDN, and then adds an emergency SRVCC indication in a 4xx response signal 1106 rejecting the INVITE, which is acknowledged in signal 1107. Upon receiving the emergency SRVCC indication in the session transfer INVITE response 1106, the MSC Server 33 initiates a new session transfer request for an emergency session by using the E-STN-SR. The MSC includes the C-MSISDN in the P-Asserted-Identity header and IMEI in the "sip.instance" media feature tag of the Contact header of the new INVITE and sends this to the IMS via the I-CSCF 28 in signal 1108.

The I-CSCF 28 forwards the new session transfer request to the EATF 25. As an optimization, the MSC Server 33 may send the INVITE request 1108 directly to the EATF 25 if it is configured to be able to route directly to the EATF 25 based on the E-STN-SR. In step 1110 the EATF 25 finds the anchored emergency session (the local and remote call legs) based on the IMEI and/or C-MSISDN received in the new session transfer INVITE 1109. The EATF 25 performs the remote call leg update by sending a Re-INVITE request 1111 to the E-CSCF 24 and the rest of the procedure as shown in signals 1112 to 1128 is the same as signals 1009 to 1025 of FIG. 10.

The embodiments described above provide solutions to the SRVCC handover problem for a UEUEC, which are based on using/configuring existing network functionality with minimal impact on the existing networking entities. In the case of the first embodiment, use is made of the PCC entities, such as the PCRF. In the second embodiment use is made of the ATCF, which is a serving network function, invoking the ATCF for SRVCC handover of a UEUEC has negligible impact on the SRVCC session transfer delay. The first alternative solution of the second embodiment has an additional advantage in that the ATCF can also be reused to solve the problems associated with different dynamic payload type numbers and different IP versions in the source and target accesses. No additional hardware (for example IBCF) is required for these solutions.

Referring again to FIG. 2, the principal network entities that are newly configured to enable the procedures described to be carried out are: for both embodiments, the P-CSCF 23 and the MSC Server 33; for the first embodiment also the MME 30 and PCRF 29; and for the second embodiment, the ATCF 27 and EATF 25. Each of these entities will typically comprise a computer server with software programmed to implement the required procedures, and with interfaces that enable the entities to communicate with other network entities, including the entities to which each is shown connected in FIG. 2.

Figure 12:
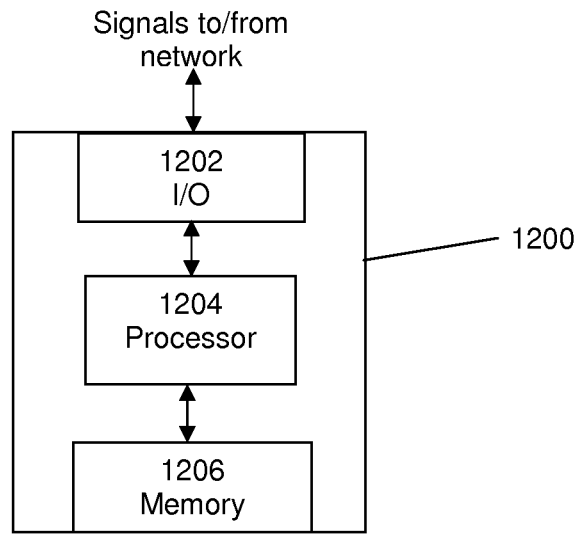
FIG. 12 is a schematic block diagram of a network entity.

FIG. 12 is a schematic block diagram showing the main hardware components of a typical network entity 1200, which could be configured to provide the required functionality of any of the principal network entities referred to above. The network entity 1200 includes an input/output 1202 for receiving and transmitting signals to/from other network entities. A memory 1206 stores data and program instructions. A processor 1204 is configured to process the program instructions.

In accordance with the first embodiment described above, the network entity 1200 may be configured as a MME of an EPC network serving a UE. Alternatively, in accordance with the second embodiment described above, the network entity 1200 could be configured as an ATCF in the serving IMS network. The serving network includes a serving IMS network in which a UEUEC is anchored. In either case the instructions configure the processor 1204 so that when the entity 1200 receives an indication that the call established by the UE using a PS access, is a UEUEC, and, either concurrently or subsequently, receives a SRVCC, handover request to hand over the call from the PS access to a CS access, the network entity initiates handover of the call so that an E-STN-SR is used and the call continues to be routed through the IMS network in which it is anchored.

The network entity 1200 may be an IMS network entity configured as a Proxy-Call Session Control Function, P-CSCF. The instructions in memory 1206 configure the processor 1204 to detect that a request from a UE to establish a call, is for an UEUEC. The entity 1200 either includes an indication that the call is an UEUEC in a message sent to a PCC entity; or forwards the request together with an emergency call indication to an ATCF to establish the call as an UEUEC anchored in the IMS network.

The network entity 1200 may be configured as a MSC server. The instructions in memory 1206 configure the processor 1204 such that, on receiving a SRVCC handover request together with an indication that the call to be handed over is an UE-undetected emergency call anchored in an IMS network, the MSC server initiates handover of the call using an E-STN-SR pre-configured in the MSC server so that the call continues to be routed through the IMS network in which it is anchored.

The network entity 1200 may be configured as a PCC entity of an IMS network. The instructions in memory 1206 configure the processor such that, on receiving an indication that a call is an UEUEC, the PCC entity 1200 includes an indication that the call is an UE-undetected emergency call in a message sent to a MME.

The network entity 1200 may be configured as a EATF. The instructions in memory 1206 configure the processor 1204 such that when the EATF receives an indication from an ATCF that an emergency call established by a UE accessing the IMS network via a PS access, is a UEUEC, together with information identifying the call, the EATF stores the call identifying information. Further when the EATF receives a message requesting a SRVCC handover of the call to a CS access, together with information identifying the call, the instructions configure the processor 1204 such that the EATF progresses the SRVCC handover of the call using the call identifying information.

Figure 13:
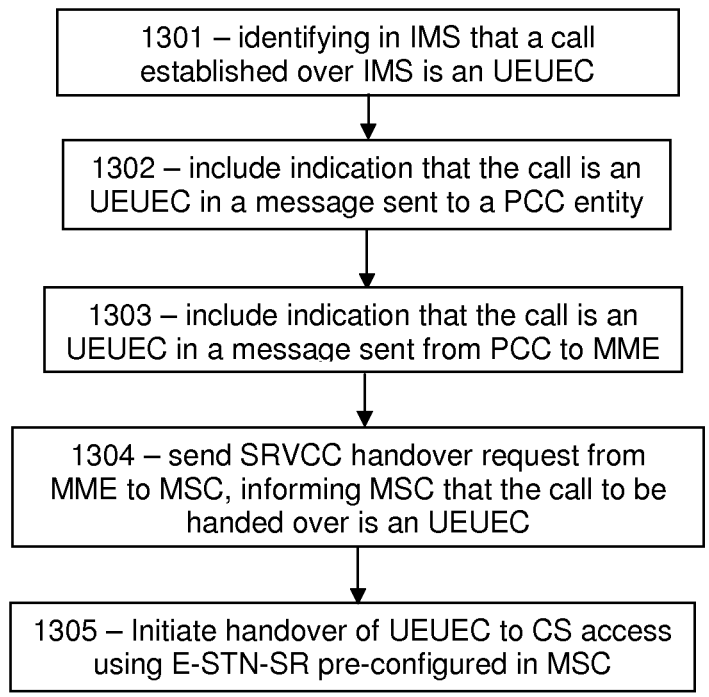
FIG. 13 is a flow diagram illustrating a sequence of method steps in accordance with one embodiment.

FIG. 13 is a flow diagram illustrating a sequence of method steps for performing a SRVCC handover of a UEUEC. At step 1301 a call, initially established over an IMS network, is identified, in the IMS, as being an UEUEC. At step 1302, an indication that the call is an UEUEC is included in a message sent to a PCC entity (e.g. PCRF). At step 1303, an indication that the call is an UEUEC is included in a message sent from the PCC entity to a MME. At step 1304, a SRVCC handover request is sent from the MME to a MSC, also informing the MSC that the call to be handed over is an UEUEC. At step 1305 handover of the call is initiated using an E-STN-SR pre-configured in the MSC, so that the call continues to be routed through the IMS network in which it was established.

Figure 14:
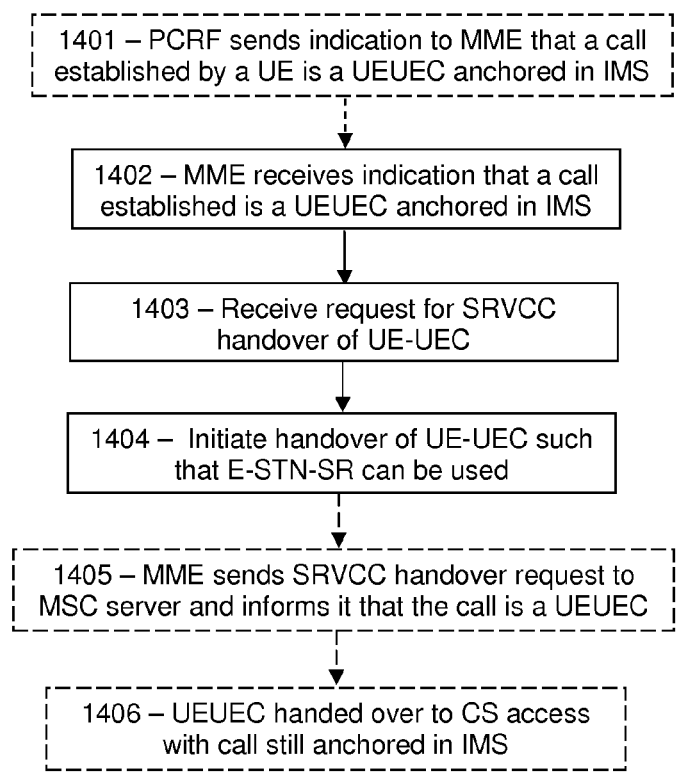
FIG. 14 is a flow diagram illustrating a sequence of method steps that involve a Mobile Management Entity in accordance with one embodiment.

FIG. 14 is a flow diagram illustrating a sequence of method steps in a method of performing a SRVCC handover of a UEUEC established by a UE accessing a serving network using a PS access, and that involves a MME in accordance with one embodiment. The steps shown in dashed outline are either optional, or steps performed by other network entities. The serving network includes a serving IMS network in which the UEUEC is anchored. At step 1401, a PCRF (or other entity) sends to the MME an indication that the established call is a UEUEC. At step 1402, the MME receives the indication (from the PCRF, or other entity). At step 1403 a SRVCC handover request is received, to hand over the call from the PS access to a CS access. At step 1404, handover of the UEUEC is initiated such that an E-STN-SR can be used and the call routed via the IMS. This may be done, as shown at step 1405, by the MME sending the SRVCC handover request to a MSC server and informing the MSC server that the call to be handed over is an UEUEC. The MSC server may then initiate handover of the call using the E-STN-SR, which is pre-configured in the MSC server. As shown, in step 1406, the call can then be handed over so that it continues to be routed through the IMS network in which it is anchored.

Figure 15:
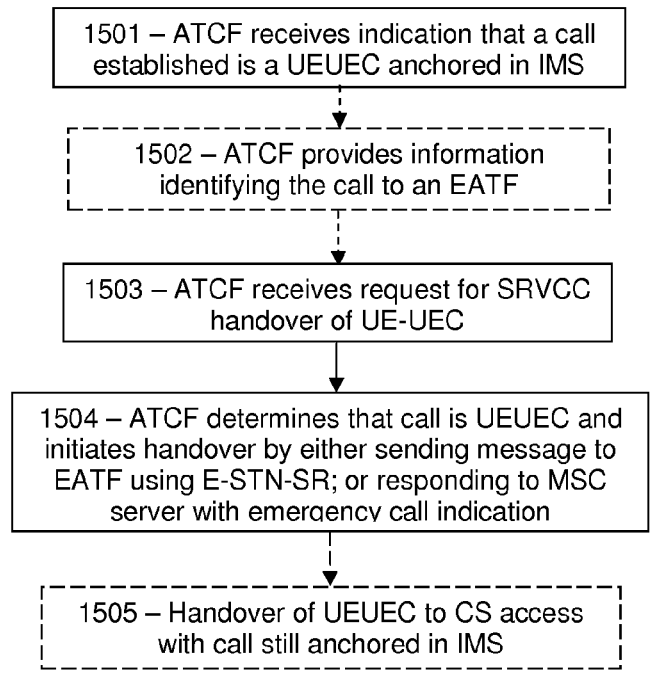
FIG. 15 is a flow diagram illustrating a sequence of method steps that involve an Access Transfer Control Function in accordance with one embodiment.

FIG. 15 is a flow diagram illustrating a sequence of method steps in a method of performing a SRVCC handover of a UEUEC established by a UE accessing a serving network using a PS access, and that involves an ATCF in accordance with one embodiment. The steps shown in dashed outline are either optional, or steps performed by other network entities. The serving network includes a serving IMS network in which the UEUEC is anchored. At step 1501, the ATCF receives an indication from the serving network that the established call is an UEUEC anchored in the serving IMS network. At step 1502, the ATCF may provide information identifying the call to an EATF. At step 1503, the ATCF receives a SRVCC handover request to hand over the call from the PS access to a CS access. At step 1504, the ATCF determines that the call is a UEUEC and initiates handover of the call either by using the E-STN-SR and sending a message identifying the call to the EATF at which the call is anchored, or by sending a response to an MSC with an emergency call indication mandating use of the E-STN-SR for the handover. As shown, in step 1505, the call can then be handed over to the CS access such that it continues to be routed through the IMS network in which it is anchored.

Figure 16:
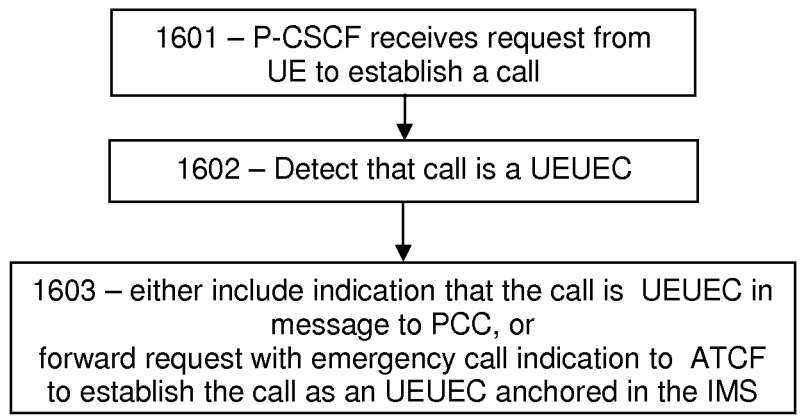
FIG. 16 is a flow diagram illustrating a sequence of method steps that involve a Proxy-Call Session Control Function in accordance with one embodiment.

FIG. 16 is a flow diagram illustrating a sequence of method steps that involve a P-CSCF in a serving IMS network, in accordance with one embodiment. At step 1601 the P-CSCF receives a request from a UE to establish a call. At step 1602, the P-CSCF recognises from the called number (or URI) that it is an emergency call and determines that the request received is to establish an UEUEC. At step 1603, either the P-CSCF includes an indication that the call is an UEUEC in a message sent to a PCC entity (e.g. PCRF), or the P-CSCF forwards the request together with an emergency call indication to an ATCF to establish the call as an UEUEC anchored in the IMS network.

Figure 17:
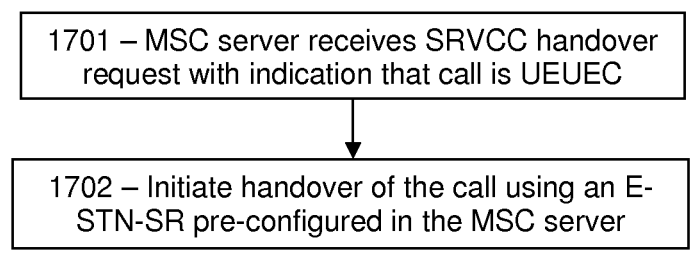
FIG. 17 is a flow diagram illustrating a sequence of method steps that involve a MSC Server in accordance with one embodiment.

FIG. 17 is a flow diagram illustrating a sequence of method steps in a method of performing a SRVCC handover of a UEUEC, that involve a MSC Server in accordance with one embodiment. At step 1701 MSC server receives a SRVCC handover request to hand over a call from a PS to a CS access, together with an indication that the call to be handed over is an UEUEC anchored in an IMS network. At step 1702 the MSC Server initiates handover of the call using an E-STN-SR pre-configured in the MSC server, so that the call continues to be routed through the IMS network in which it is anchored. The handover may be initiated by the MSC server sending an INVITE with the E-STN-SR as the B party address. However, in general for a SRVCC handover initiation the MSC server could also send an IAM message with the E-STN-SR, which is then interworked by a Media gateway Control Function, MGCF, to an INVITE with E-STN-SR.

The invention claimed is:

1. A method of performing a Single Radio Voice Call Continuity (SRVCC) handover of a telecommunications call established by a User Equipment (UE) accessing a serving network using a Packet Switched (PS) access, the method comprising:

receiving an indication from the serving network that the call established by the UE accessing the serving network using the PS access is a UE-undetected emergency call anchored in a serving Internet Protocol (IP) Multimedia Subsystem (IMS) network, wherein the serving network includes the IMS network and the call is established as the UE-undetected emergency call to a Public Safety Access Point (PSAP) and is anchored in the serving IMS network;

receiving a SRVCC handover request to hand over the call from the PS access to a Circuit Switched (CS) access; and initiating a handover of the call that, in response to the indication that the established call is the UE-undetected emergency call, uses an Emergency Session Transfer Number-Single Radio (E-STN-SR) that causes the call to continue to be routed through the IMS network in which it is anchored.

2. The method of claim 1, wherein:

the indication that established call is a UE-undetected emergency call is received at a Mobile Management Entity (MME); and the MME sends the SRVCC handover request to a Mobile Switching Centre (MSC) server and informs the MSC server that the call to be handed over is a UE-undetected emergency call so that the MSC server initiates handover of the call using the E-STN-SR, which is pre-configured in the MSC server.

3. The method of claim 2 wherein the indication that the call is a UE-undetected emergency call is received in a message sent from a Policy and Charging Control (PCC) entity to the MME.

4. The method of claim 3 wherein the PCC entity from which the indication that the call is a UE-undetected emergency call is sent is a Policy and Charging Rules Function (PCRF).

5. The method of claim 1, wherein the indication that the established call is a UE-undetected emergency call is received at an Access Transfer Control Function (ATCF) when the call is established, the ATCF providing information identifying the call to an Emergency Access Transfer Function (EATF) at which the call is anchored.

6. The method of claim 5 wherein, when the SRVCC handover request is received the ATCF determines that the call to be handed over is a UE-undetected emergency call and sends a message to the EATF specifying the E-STN-SR and information identifying the call for completing the handover of the call.

7. The method of claim 5 wherein the SRVCC handover request is received by the ATCF from a MSC server, the ATCF determines that the call to be handed over is a UE-undetected emergency call and sends a response with an emergency call indication to the MSC server, wherein the E-STN-SR is made available to the MSC server for use when completing the handover of the call.

8. The method of claim 5, wherein the information identifying the call comprises an International Mobile Equipment Identity (IMEI) and a Correlation Mobile Subscriber Integrated Services Digital Network- Number (C-MSISDN).

9. The method of claim 8 wherein when the SRVCC handover request is received a SIP INVITE message is received by the ATCF, the INVITE including the C-MSISDN and the ATCF determines that the call to be handed over is a UE-undetected emergency call based on the C-MSISDN.

10. The method of claim 1 wherein the indication that the call is a UE-undetected emergency call is received from a Proxy-Call/Session Control Function (P-CSCF) in the IMS network.

11. A method in a telecommunications network of performing a Single Radio Voice Call Continuity (SRVCC) handover of a User Equipment (UE)-undetected emergency call, wherein the call is initially established over an Internet Protocol (IP) Multimedia Subsystem (IMS) network, the method comprising:

identifying in the IMS that the call is a UE-undetected emergency call;

including an indication that the call is a UE-undetected emergency call in a message sent to a Policy and Charging Control (PCC) entity;

including an indication that the call is a UE-undetected emergency call in a message sent from the PCC entity to a Mobile Management Entity (MME);

sending a SRVCC handover request from the MME to a Mobile Switching Centre (MSC), and, in response to the indication, informing the MSC that the call to be handed over is a UE-undetected emergency call; and initiating a handover of the call that, in response to the informing that the call to be handed over is the UE-undetected emergency call, uses an Emergency Session Transfer Number-Single Radio (E-STN-SR) pre-configured in the MSC wherein the E-STN-SR causes the call to continue to be routed through the IMS network in which it was established.

12. A telecommunications network entity comprising:

an input/output through which messages and data are received from and sent to other network entities;

a processor; and a memory storing data and instructions for configuring the processor such that:

when the network entity receives an indication that a call established by a User Equipment (UE) accessing a serving network using a Packet Switched (PS) access, is a UE-Undetected emergency call, wherein the serving network includes a serving Internet Protocol (IP) Multimedia Subsystem (IMS) network in which the UE-undetected emergency call is anchored, and, either concurrently or subsequently, receives a Single Radio Voice Call Continuity (SRVCC) handover request to hand over the call from the PS access network to a Circuit Switched (CS) access network, initiates a handover of the call that, in response to the indication that the call established by the UE is the UE-undetected emergency call, uses an Emergency Session Transfer Number-Single Radio (E-STN-SR) that causes the call to continue to be routed through the IMS network in which it is anchored.

13. The network entity of claim 12, configured as Mobile Management Entity of an Evolved Packet Core (EPC) network.

14. The network entity of claim 12, configured as an Access Transfer Control Function in the IMS network.

15. A Mobile Switching Centre (MSC) server of a telecommunications network, comprising:

an input/output through which messages and data are received from and sent to other network entities;

a processor; and a memory storing data and instructions for configuring the processor such that, on receiving a Single Radio Voice Call Continuity (SRVCC) handover request together with an indication that the call to be handed over is a User Equipment (UE)-undetected emergency call anchored in an Internet Protocol (IP) Multimedia Subsystem (IMS) network, the processor causes the MSC server to initiate a handover of the call using an Emergency Session Transfer Number-Single Radio (E-STN-SR pre-configured in the MSC server that causes the call to continue to be routed through the IMS network in which it is anchored.

16. A method in a telecommunications network comprising:
- receiving at a Mobile Switching Centre (MSC) server a Single Radio Voice Call Continuity (SRVCC) handover request to hand over a call from a Packet Switched (PS) to a Circuit Switched (CS) access, together with an indication that the call to be handed over is a User Equipment (UE)-undetected emergency call anchored in an Internet Protocol (IP) Multimedia Subsystem (IMS) network; and
- initiating a handover of the call that, in response to the indication that the call to be handed over is the UE-undetected emergency call, uses an Emergency Session Transfer Number-Single Radio (E-STN-SR) pre-configured in the MSC server that causes the call to continue to be routed through the IMS network in which it is anchored.

* * * * *